United States Patent [19]

Repella

[11] 4,451,050
[45] May 29, 1984

[54] BI-DIRECTIONAL HYDRODYNAMIC SLITTED SEAL

[75] Inventor: James A. Repella, Berkley, Mich.

[73] Assignee: Microdot Inc., Darien, Conn.

[21] Appl. No.: 494,817

[22] Filed: May 16, 1983

Related U.S. Application Data

[63] Continuation-in-part of Ser. No. 322,640, Nov. 18, 1981, abandoned.

[51] Int. Cl.³ .......................... F16J 15/32; F16J 15/54
[52] U.S. Cl. .......................................... 277/134; 277/1;
277/152
[58] Field of Search .................... 277/1, 134, 152, 153, 277/154

[56] References Cited

U.S. PATENT DOCUMENTS

| 2,606,779 | 8/1952 | Jagger | 277/134 |
| 3,620,540 | 11/1971 | Jagger et al. | 277/134 |
| 3,929,341 | 12/1975 | Clark | 277/134 |
| 4,118,856 | 10/1978 | Bainard et al. | 277/134 X |
| 4,132,421 | 1/1979 | Corsi et al. | 277/134 X |

FOREIGN PATENT DOCUMENTS 492954 9/1938 United Kingdom ................. 277/152

OTHER PUBLICATIONS

*The Journal of Teflon,* "Advances in Radial Seal Lips of Teflon," Jan.–Feb. 1970, vol. 11, No. 1, pp. 2–4.

Primary Examiner—Robert S. Ward
Attorney, Agent, or Firm—Lyman R. Lyon

[57] ABSTRACT

A polytetrafluoroethylene seal with intersecting arcuate slitted grooves to effect bi-directional hydrodynamic pumping of oil due to rotation of a shaft about which the seal is disposed.

8 Claims, 4 Drawing Figures

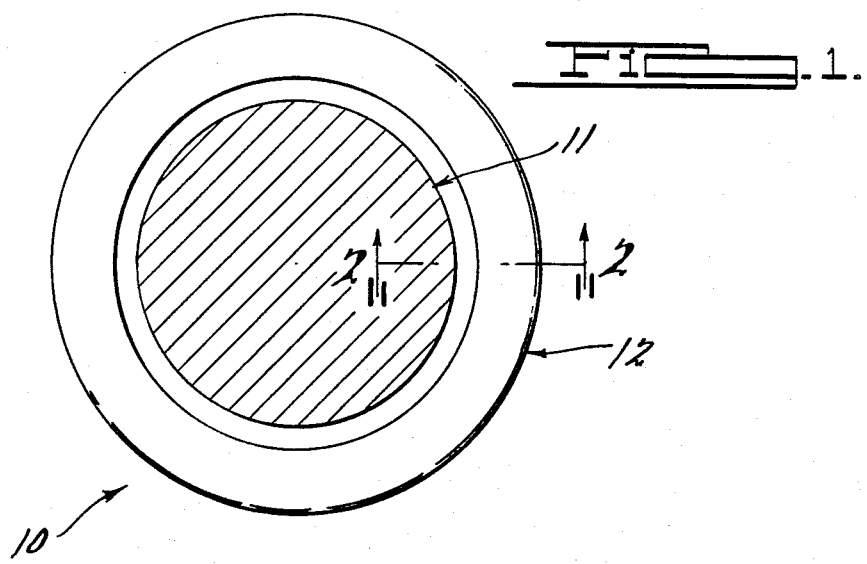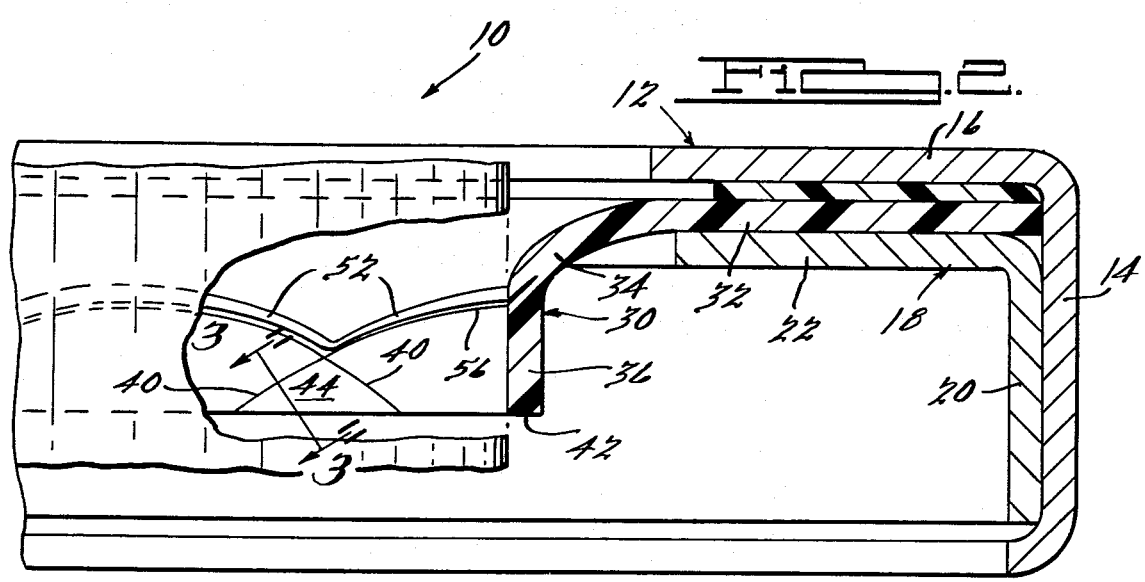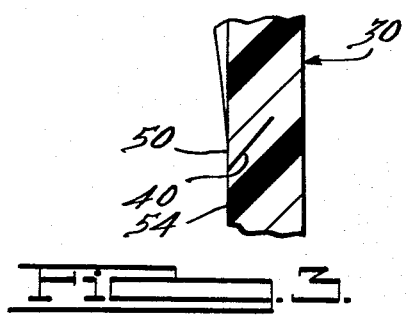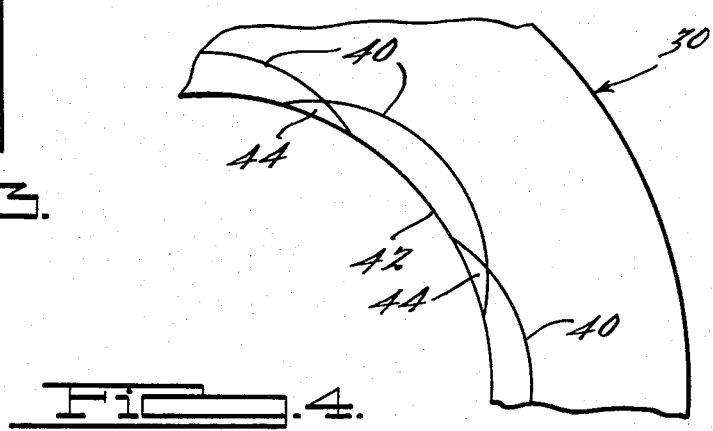

BI-DIRECTIONAL HYDRODYNAMIC SLITTED SEAL

CROSS REFERENCE TO RELATED APPLICATION

This application is a continuation-in-part of application Ser. No. 322,640, filed Nov. 18, 1981, for Bi-Directional Hydrodynamic Seal, now abandoned.

BACKGROUND OF THE INVENTION

While polytetrafluoroethylene is well known for its ability to withstand the environmental conditions to which oil seals are exposed incident to sliding contact with a shaft, its use has been limited by its inability to be molded in an efficient manner. This problem has been solved heretofore by first grooving the end of a billet of polytetrafluoroethylene and thereafter cutting the polytetrafluoroethylene seal element from the billet as taught in, for example, U.S. Pat. No. 3,857,156. Other teachings of grooving a seal are found in the patents to Jagger, U.S. Pat. No. 2,606,779 and Corsi, U.S. Pat. No. 4,132,421.

Patents that teach the use of built-up ribs to effect hydrodynamic pumping of oil are Bainard, U.S. Pat. No. 4,118,856 or Jagger, U.S. Pat. No. 3,620,540. A teaching of both ribs and grooves is found in the "Journal of Teflon", pages 2–4, January 1970. However both open grooves and built-up ribs exhibit operational problems to which the present invention presents a solution.

SUMMARY OF THE INVENTION

The present invention relates to a seal having a polytetrafluoroethylene seal element, the shaft engaging face of which has an improved hydrodynamic configuration in the form of a slit that tends to remain essentially closed adjacent the oil side of the seal and open up slightly toward the air side of the seal. Moreover, the angle of the slit changes relative to a shaft enveloped by the seal in a manner that augments pumping adjacent the oil side of the seal lip.

More specifically, a series of circumferentially spaced, overlapping, arcuate slits extend at a varying angle relative to the central axis of a shaft about which the seal is disposed. The slits at the oil side of the seal are essentially closed but open slightly to define collector grooves in the face of the seal element that function to pump oil towards the slits adjacent the oil side of the seal lip. The seal element is supported in the conventional manner by a pair of metal stampings to facilitate mounting about a shaft.

BRIEF DESCRIPTION OF THE DRAWINGS

In the drawings:

FIG. 1 is an elevational view of a shaft having a seal thereabout with a polytetrafluoroethylene seal element in accordance with the present invention;

FIG. 2 is an enlarged view taken along the line 2—2 of FIG. 1;

FIG. 3 is a view taken along the line 3—3 of FIG. 2; and

FIG. 4 is a fragmentary view of the polytetrafluoroethylene seal element prior to assembly in a supporting metal stamping and flex of the radially inner portion thereof to a cylindrical configuration due to assembly with a shaft.

DETAILED DESCRIPTION OF THE PREFERRED EMBODIMENT OF THE INVENTION

A shaft seal 10 is shown operatively disposed about a shaft 11. The seal 10 comprises an outer case 12 having a cylindrical portion 14 and a radial flange 16. An inner case 18 has a cylindrical portion 20 and a radial flange 22 and is nested in the outer case 12. A seal element 30, preferably made from polytetrafluoroethylene, has a flat radially outer portion 32, an intermediate flex portion 34, and a generally cylindrical radially inner portion 36.

In accordance with the present invention, the shaft engaging radially inner portion 36 of the polytetrafluoroethylene seal element 30 is provided with a plurality of arcuate slits 40 that intersect a radially inner edge 42 (see FIG. 4) at the oil side of the element 30. At the point of maximum spacing from the edge 42, the slits 40 extend at an angle of approximately 45° to the central axis of the shaft 11. It is to be noted that the angle of the slit 40, relative to the central axis of the seal element 30, varies along the arc of the slit so as to present a relatively efficient pumping configuration at the intersection of the slits 40 with the edge 42 of the element 30. More specifically, the angle of the arcuate slit 40 is maintained at 45° relative to a tangent to the surface of the shaft 11 in a plane containing the axis of generation of the arc. The slits 40 collect oil carried circumferentially upon rotation of the shaft 11 due to a pressure differential of the seal element 30 on the shaft 11 on opposite sides of the slits 40. Because the arc of the slit 40 intersects the oil side of the seal element 30, rotation of the shaft 11 in either direction relative to the seal 10 will effect hydrodynamic pumping of oil back to the oil side of the seal 10.

The end portions of the slits 40 intersect to define a plurality of circumferentially spaced triangular pads 44. The slits 40 define the upper edges of the pads 44, as seen in FIGS. 2 and 4, and function as primary pumping elements that tend to return any oil which may leak along the shaft 11 back to the oil side of the seal 10 during rotation of the shaft 11 in either direction.

In a constructed embodiment of the instant invention, the radius of the slits 40 is less than the radius of the aperture in the seal element 30, and the axial height of the slits 40 from the inner edge of the element 30, as seen in FIG. 2 is approximately one-fourth to one-eighth the radius thereof.

As best seen in FIG. 2, the portion of each slit 40 in the seal element 30 above the pads 44 opens up slightly upon flexure of the radially inner portion 36 thereof to a cylindrical configuration to form collector grooves that carry leakage oil to the slits 40 that define the pads 44 which function as primary pumping grooves. Both the primary and collector grooves direct any leakage oil back to the oil side of the seal 10.

An important feature of the instant invention is the fact that the slits 40 extend into the flex section 34 of the element 30 to aid in flexure of the shaft engaging portion 36 of the seal element 30 relative to the radially outer portion 32 thereof. In this manner the pads 44 as well as the cylindrical portion 36 of the seal element 30 between the pads 44 are conditioned to lie in what is essentially a true cylinder, and accordingly, make substantially full face contact with the shaft 11 about which the seal 10 is disposed.

As best seen in FIG. 3, and in accordance with yet another feature of the instant invention, lip springs have been eliminated in the seal 10 due to the fact that downwardly extending upper lip face 50 defined by a slit 40 is self-biased into full face contact with the shaft 11. Similarly, downwardly extending upper lip faces 52 on the portion of the slits 40 between the pads 44 are self-biased into full face contact with the shaft 11. Stated in another manner, the angle of the slits 40 in combination with flexure and the inherent resilience of the seal element 30 results in a relatively higher unit pressure of the upper lip faces 50 and 52 of the slits 40 on the shaft 11 than the unit pressure of the juxtaposed but axially spaced lower lips 54 and 56 of the seal element 30 on the shaft 11. Thus, leakage oil is admitted to the slits 40 which effect pumping thereof toward the oil side of the seal 10.

It also is to be noted that the inherent resiliency of the faces 50 and 52 in combination with the fact that they are cantilevered relative to the intermediate flex portion 34 of the seal element 30, results in sealing against the shaft 11 even in conditions of severe shaft runout.

Another feature of the instant invention stems from the orientation of the slits 40 relative to one another and the relationship of the intermediate flex portion 34 to the shaft engaging portion 36 of the seal element 30. Because the faces 54 on the pads 44 are closer to the free edge of the seal element 30, unit pressure thereof on the shaft 11 is less than the unit pressure of the faces 50 thereon between the pads 42. Therefore, the pads 44 tend to "open up" radially to facilitate pumping of oil back to the oil side of the seal 10.

While Teflon was used in a constructed embodiment of the instant invention, it should be apparent that the concept of the invention is applicable to rubber, or other elastomeric compounds as well.

While the preferred embodiment of the invention has been disclosed, it should be appreciated that the invention is susceptible of modification without departing from the scope of the following claims.

I claim:

1. A bi-directional hydrodynamic oil seal comprising an annular case, and a thin washer-like seal element having a radially outer portion supported by said case and a generally cylindrical radially inner portion adapted to engage a shaft, the radially inner portion of said seal element having a plurality of generally arcuate slits in the surface thereof that extend at an acute angle relative to the central axis of the shaft and divergent from the oil side of said seal and intersect the radially inner edge of said seal element to effect hydrodynamic pumping in conjunction with a rotating shaft.

2. A seal in accordance with claim 1, wherein the radius of said slits is less than the diameter of the shaft engaging portion of said seal element.

3. A seal in accordance with claim 2 wherein the edge of said slits farthest from the oil side of said seal is self-biased into full face contact with said shaft.

4. A seal in accordance with claim 1 wherein said arcuate slits intersect one another to define generally triangular pads engageable with the surface of the shaft.

5. A seal in accordance with claim 2 wherein the portions of said arcuate slits between said triangular pads define flex lines between said radially inner portion and an intermediate portion of said seal element thereby to facilitate deflection of said pads into full contact with a shaft.

6. A hydrodynamic oil seal comprising an annular case, and a thin washer-like seal element having a radially outer peripheral portion supported by said case and a generally cylindrical radially inner portion adapted to engage a shaft, the radially inner portion of said seal element having plurality of slits therein extending at an angle to the shaft engaging surface thereof to effect hydrodynamic pumping in conjunction with a rotating shaft, the adjacent walls of said slits being in close juxtaposed substantially parallel relation.

7. A seal in accordance with claim 6 wherein said slits define flex lines that facilitate deflection of the radially inner portion of said seal element into contact with a shaft.

8. A seal in accordance with claim 7 wherein the circumferentially spaced portions of the radially inner portion of said seal element exhibit a relatively lower unit pressure against the shaft then adjacent portions of said seal element.

* * * * *